(12) United States Patent
Jordan

(10) Patent No.: US 8,695,738 B2
(45) Date of Patent: Apr. 15, 2014

(54) CONSTANT-RATIO INDEPENDENT SERIES-PARALLEL HYBRID DRIVETRAIN FOR A PLUG-IN ELECTRIC VEHICLE

(76) Inventor: Diala Nassif Jordan, Pearland, TX (US)

( * ) Notice: Subject to any disclaimer, the term of this patent is extended or adjusted under 35 U.S.C. 154(b) by 594 days.

(21) Appl. No.: 12/661,819

(22) Filed: Mar. 25, 2010

(65) Prior Publication Data

US 2010/0252342 A1    Oct. 7, 2010

Related U.S. Application Data

(60) Provisional application No. 61/211,115, filed on Mar. 30, 2009.

(51) Int. Cl.
*B60K 6/48* (2007.10)

(52) U.S. Cl.
USPC ........... 180/65.25; 903/911; 180/65.21

(58) Field of Classification Search
USPC .......... 180/65.21, 65.1, 65.245, 65.25–65.29, 180/65.31, 65.275–65.285; 701/22
See application file for complete search history.

(56) References Cited

U.S. PATENT DOCUMENTS

| | | | | |
|---|---|---|---|---|
| 3,503,464 A | * | 3/1970 | Yardney | 180/65.245 |
| 4,042,056 A | * | 8/1977 | Horwinski | 180/65.25 |
| 4,180,138 A | * | 12/1979 | Shea | 180/65.25 |
| 4,470,476 A | * | 9/1984 | Hunt | 180/65.25 |
| 5,327,992 A | * | 7/1994 | Boll | 180/65.25 |
| 5,343,970 A | * | 9/1994 | Severinsky | 180/65.25 |
| 3,566,717 A | * | 11/1994 | Dorchak et al. | 477/3 |
| 5,845,731 A | * | 12/1998 | Buglione et al. | 180/65.23 |
| 6,338,391 B1 | * | 1/2002 | Severinsky et al. | 180/65.23 |
| 7,597,164 B2 | * | 10/2009 | Severinsky et al. | 180/65.27 |
| 2010/0081533 A1 | * | 4/2010 | Lee et al. | 475/5 |

* cited by examiner

*Primary Examiner* — John Walters
*Assistant Examiner* — James Triggs
(74) *Attorney, Agent, or Firm* — Erickson, Kernell, Derusseau & Kleypas, LLC

(57) ABSTRACT

A drivetrain for a plug-in hybrid vehicle which uses constant gear ratios, rather than any type of multi-gear transmission (traditional transmission gears or CVT) to power the driven wheels in order to increase drivetrain efficiency. A transmission is not a necessary drivetrain component for vehicles with an electric motor/generator (EMG). The EMG is the only mechanical power source until highway speeds are achieved. At that time, the driver may choose to activate and engage the small internal combustion engine (ICE) and the EMG is usually electrically disconnected so that it does not regeneratively charge the vehicle batteries using the power created by the ICE. Constant gear ratios may be achieved by a mechanical gearing system or by a belt drive system. This drivetrain is only for plug-in hybrid vehicles where the batteries are primarily charged by AC electrical outlet or solar (photovoltaic) cells.

20 Claims, 6 Drawing Sheets

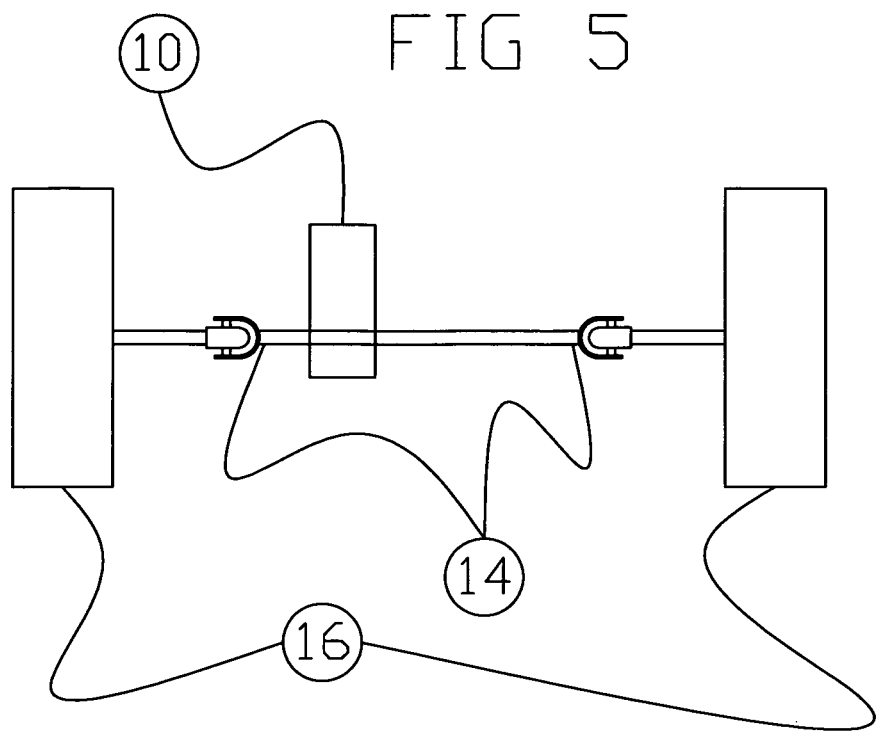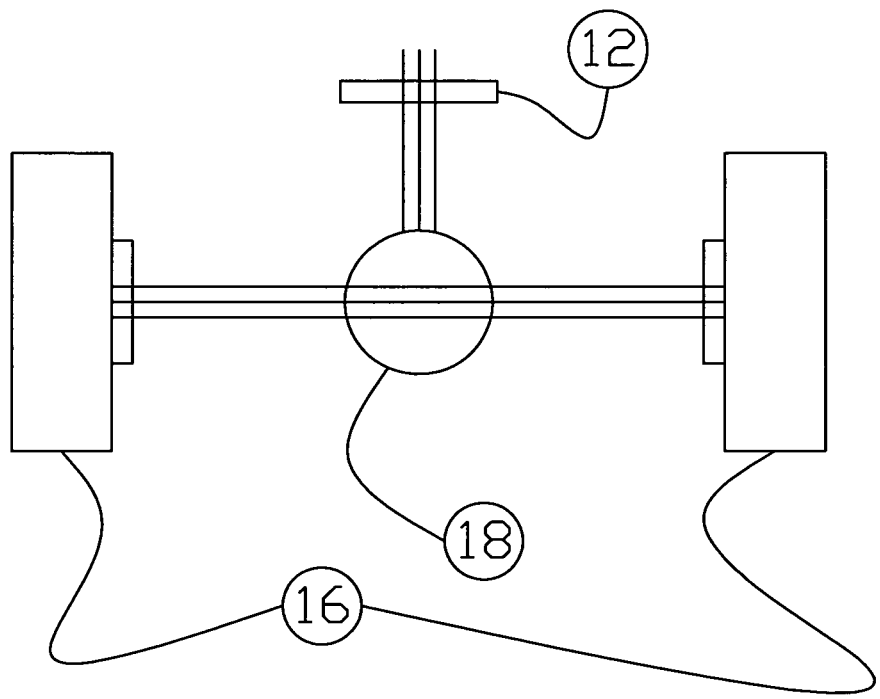
FIG 5

FIG 6
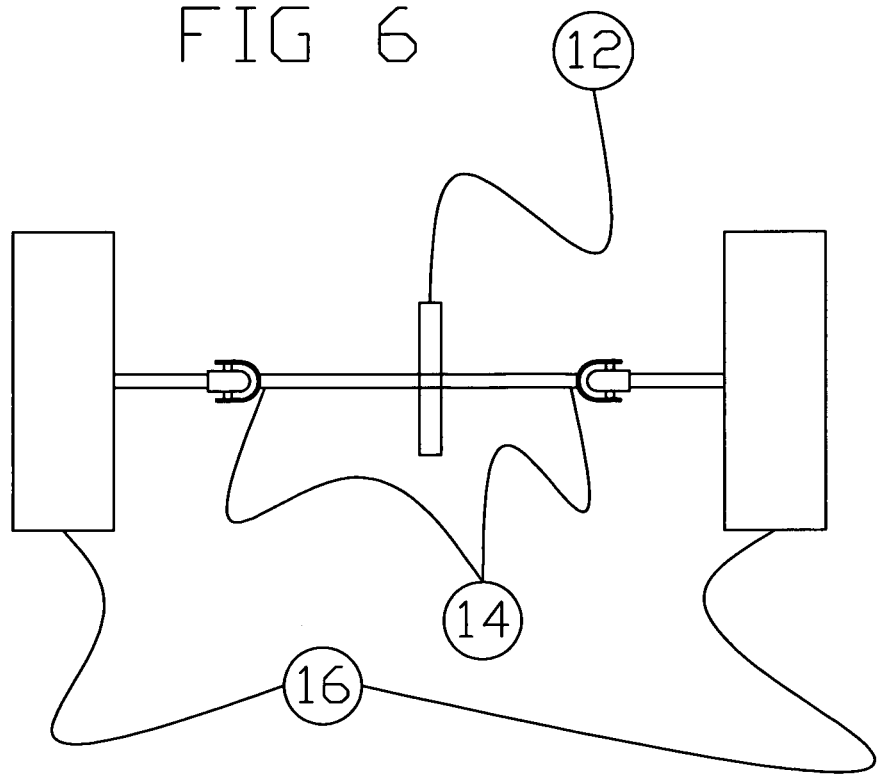
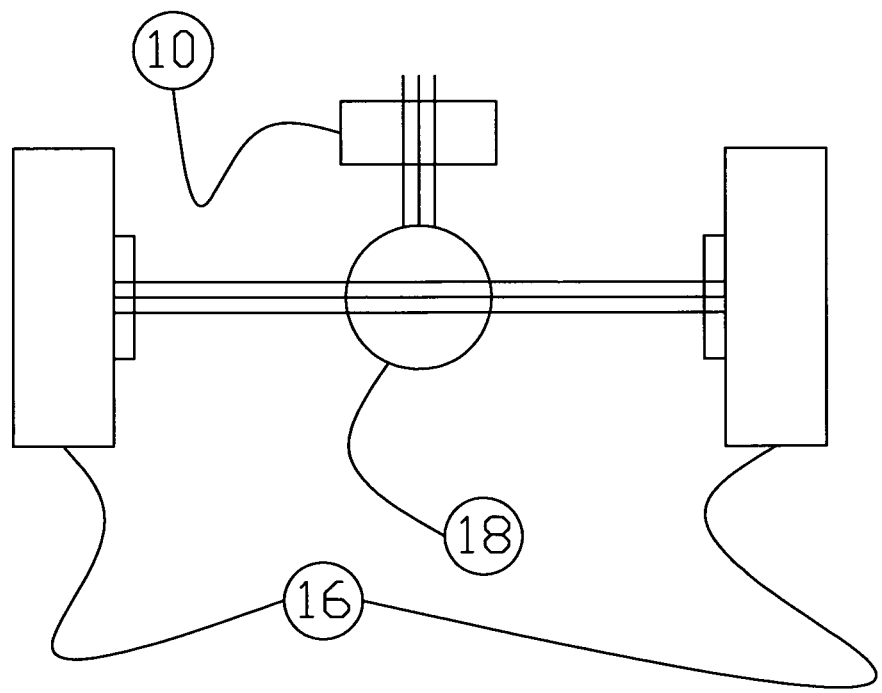

CONSTANT-RATIO INDEPENDENT SERIES-PARALLEL HYBRID DRIVETRAIN FOR A PLUG-IN ELECTRIC VEHICLE

CROSS-REFERENCE TO RELATED APPLICATIONS

Parent Case Data:
This application claims the benefit of and incorporates by reference co-pending provisional application Ser. No. 61/211,115 filed Mar. 30, 2009.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of transportation. More particularly, the present invention is in the technical field of automobiles. More particularly, the present invention is in the technical field of light passenger vehicles. More particularly, this invention is in the field of hybrid electric vehicles incorporating both an internal combustion engine (ICE) and an electric motor (EM) as sources of power and torque to drive the vehicle. More particularly, this invention relates to plug-in hybrid electric vehicles, which are capable of using electric power only for short distances (no gasoline or diesel fuel needed) of approximately 80 miles (depending upon a variety of circumstances and capacity of the battery pack) but are capable of using gasoline or diesel fuel (which are quickly refueled) to significantly expand the range of the vehicle.

PRIOR ART

Series Hybrid Drivetrain: Shortcomings: Internal Combustion Engine (ICE) to Generator to Battery Efficiency is typically very low (20-30%), yet the ability to utilize a very small ICE contributes to overall drivetrain efficiency.

Parallel Hybrid Drivetrain: Shortcomings: A transmission is required for full-range use of ICE, which increases mechanical complication and decreases total efficiency. Also, a larger ICE may be required to supplement the Electric Motor/Generator (EMG).

Series-Parallel Hybrid Drivetrain: Shortcomings: A transmission is required for full-range use of ICE, which increases mechanical complication and decreases total efficiency. Also, a larger ICE may be required to supplement the Electric Motor/Generator (EMG).

Plug-In Electric Drivetrain: Shortcomings: Very large and/or expensive battery packs are required to drive for a moderate distance. Long-distance driving is currently not possible due to a lack of technology and infrastructure.

Typical Plug-In Hybrid Drivetrain: Shortcomings: A transmission is required for full-range use of ICE, which increases mechanical complication and decreases total efficiency. Also, a larger ICE may be required to supplement the Electric Motor/Generator (EMG).

U.S. Pat. No. 3,503,464 describes the means for switching between an electric motor and an internal combustion engine in a hybrid vehicle, but it focuses on a direct-current (DC) electric motor which does not allow for regeneration. Further, many of the concepts refer to "levers" and analog devices which are inefficient and outdated compared to modern digital logic controllers and standardized measurement devices. Further, '464 does not mention the concepts of plug-in hybrids or constant-ratio gearing, both of which significantly improve overall vehicle efficiency.

Similarly, U.S. Pat. No. 3,566,717 describes the means for switching between an electric motor and an internal combustion engine in a hybrid vehicle, but it is a complicated invention using multiple electric motors such as a "torquer" and a "speeder" which would likely result in decreased drivetrain reliability. In the present invention, those devices are replaced by the digital motor controller. Further, '717 does not mention the concept of plug-in hybrids which significantly improves overall vehicle efficiency.

Similarly, U.S. Pat. Nos. 4,042,056 and 4,180,138 describe the means for switching between an electric motor and an internal combustion engine in a hybrid vehicle in a manner similar to the AWD mode of this present invention. However, neither existing patent mentions the concepts of plug-in hybrids or constant-ratio gearing, both of which significantly improve overall vehicle efficiency.

Similarly, U.S. Pat. Nos. 4,470,476; 5,327,992; 5,697,466; and 7,426,975 describe the means for. switching between an electric motor and an internal combustion engine in a hybrid vehicle, but it utilizes a conventional automatic or manual transmission which decreases drivetrain efficiency. In the present invention, those conventional transmissions are replaced by the digital motor controller and constant gear ratio devices. Further, those existing patents do not mention the concepts of plug-in hybrids or constant-ratio gearing, both of which significantly improve overall vehicle efficiency.

Similarly, U.S. Pat. No. 5,845,731 describes the means for switching between an electric motor and an internal combustion engine in a hybrid vehicle, the electric motor utilizes a clutch to engage and disengage power to the wheels, resulting in decreased drivetrain efficiency. Further, the device requires a "plurality of pinion gears" which will further result in decreased drivetrain efficiency. Further, '731 does not mention the concept of plug-in hybrids or constant-ratio gearing, both of which significantly improve overall vehicle efficiency.

Similarly, U.S. Pat. No. 6,338,391 describes the means for switching between an electric motor and an internal combustion engine in a hybrid vehicle using methods which are similar to U.S. Pat. No. 5,343,970 (discussed in detail below) but places an emphasis on the advantages of turbocharged internal combustion engines. The present invention would not benefit from the use of turbocharged internal combustion engines. Further, '391 does not mention the concept of plug-in hybrids which significantly improves overall vehicle efficiency.

Similarly, U.S. Pat. No. 7,597,164 describes the means for switching between an electric motor and an internal combustion engine in a hybrid vehicle using methods which are similar to U.S. Pat. No. 5,343,970 (discussed in detail below) but utilizes a two-speed transmission. The present invention does not utilize a transmission. Further, '164 does not mention the concept of plug-in hybrids which significantly improves overall vehicle efficiency.

The most similar prior art is U.S. Pat. No. 5,343,970. However there are several key differences between the various claims of U.S. Pat. No. 5,343,970 and the present invention.

1. While the '970 also makes a provision for a fixed-ratio/ constant-ratio gearing system, it requires a "controllable torque transfer unit" to decide if the EM or the ICE will power the driven wheels. For the present invention, the EM is always mechanically connected to the driven wheels via the constant-ratio gearbox. A switch will disengage the EM from the battery pack when the ICE is engaged.
2. Also, while the '970 makes a provision for a "controller" and "torque transfer unit" to determine torque output to the wheels, the present invention only requires an electrical and/or mechanical actuator to engage or disengage the ICE output power since the EM is always mechanically connected to the driven wheels via the constant-ratio gearbox.
3. Also, while the '970 makes a provision to operate both the EM and ICE as an "acceleration/hill climbing mode," the present invention does not allow the ICE to supplement the power of the EM. The vast majority of available power to the wheels will come from the EM; therefore, the only circumstances where the EM and ICE may operate simultaneously is when the energy of the battery pack is sufficiently consumed and continued electricity consumption from the battery pack could damage the battery pack or in rare situations where the ICE requires supplementary power from the EM at highway speeds.

The battery pack is sized such that this occurrence is extremely rare; this occurrence is considered to be a "limp home" emergency feature, not a normal operational mode.

4. Also, while the '970 uses the EM as a starter, the present invention requires that the ICE be started with a conventional starter in order to avoid a sudden jolt upon engaging the ICE. By starting the ICE with its own electrical starter (which is relatively small, light, and inexpensive), then increasing output RPM of the ICE until they match the output RPM of the EM, the electrical and/or mechanical actuator will be subject to a very light load and will result in smooth transition from EM to ICE and vice versa. This will also increase the life expectancy of the electrical and/or mechanical actuator. This will also greatly increase drivetrain efficiencies under the "ICE only" mode.
5. Also, the '970 can be operated under 6 different modes of operation (low-speed, steady speed, acceleration/hill climb, battery charging, braking, and engine starting). The present invention only operates under 4 modes:
    EM only: includes idle/neutral, forward to approximately 87 mph, reverse, and regenerative braking.
    ICE only: sustained forward speeds above approximately 40 mph.
    Limp Home/Safe Power: temporary emergency mode which re-engages the electric motor under certain situations in order to prevent possible damage to battery pack or internal combustion engine, or when immediate power is needed to avoid an unsafe driving situation.
    AWD: allows for 4 driven wheels; see FIGS. 3 through 6.
6. Also, the '970 is a traditional hybrid electric vehicle, not a plug-in hybrid vehicle. The present invention is for plug-in hybrid vehicles only, where most of the electrical energy is from an electrical outlet (or, possibly, photovoltaic solar panels), not power converted from the ICE into electrical energy.
7. Also, the '970 utilizes a two-way clutch to transfer torque output from the ICE to the "controllable torque transfer unit" and then to the wheels. The present invention utilizes an electrical and/or mechanical actuator to transfer output power from the ICE to the wheels. This will greatly increase drivetrain efficiencies under the "ICE only" mode.

BRIEF SUMMARY OF THE INVENTION

The present invention is a constant-ratio independent series-parallel hybrid drivetrain for plug-in hybrid vehicles. The electric motor/generator (EMG) component of a plug-in hybrid vehicle is extremely efficient. When the vehicle stops temporarily, it consumes no power, unlike an internal combustion engine (ICE). It requires no transmission due to its digital motor controller/inverter (DMCI). The DMCI allows the electric motor/generator (EMG) to convert electric energy to mechanical energy from zero RPM to a specified limit (for example, 12,000 RPM). The DMCI also allows the EMG to act as a generator which converts mechanical energy to electric energy. While a multi-gear transmission is not required for the EMG, a constant-ratio (for example, 10:1) gearbox mechanism is used to multiply power to the wheels without significantly decreasing drivetrain efficiency. There are several examples of suitable constant gear mechanisms for the EMG, including, but not limited to, worm gears, helical gears, and helical worm gears.

When driving short to moderate distances in a plug-in electric hybrid vehicle, the battery pack provides enough energy. For long distances, an internal combustion engine (ICE) is still the best choice because the existing gasoline and diesel infrastructure allows for easy and fast access to fuel, continuous, low-impact movement helps minimize ICE wear, and most battery packs experience diminished life cycles when charged very quickly. A low-power ICE is all that is required to maintain highway speeds for modern, aerodynamic vehicles. To further improve ICE efficiency, remove the transmission and use a constant gear ratio to power the plug-in electric hybrid vehicle at highway speeds. For example, a 2.5:1 constant gear ratio could be accomplished via belt drive(s) or mechanical gears such as cogwheels, spur gears, or helical gears. Multi-gear transmissions (including CVT) are necessary for most vehicles, but they are not necessary for plug-in vehicles (hybrid or all-electric). The main purpose of removing the transmission is to increase drivetrain efficiency. A transmission, long considered to be a necessary component of a drivetrain, has a typical drivetrain efficiency of 60-80%. Conversely, constant-ratio gearing has a typical drivetrain efficiency of 90-97%.

The other significant advance within this invention is the "independent" aspect which recognizes the clearly-defined advantages of both the EMG-powered drivetrain and the ICE-powered drivetrain. In order to maximize efficiency, it is important to note that the EMG and the ICE will only simultaneously power the wheels for as long as it takes to transition from one to the other (no more than 5 seconds), or in the event that the battery pack energy has been substantially depleted. This is to avoid a scenario where the ICE powers the EMG unless it is necessary in order to maintain vehicle electrical power or in order to avoid permanent damage to the battery pack or one of its components. In order to allow the vehicle to maintain or achieve a safe speed on highways, the ICE may require occasional supplementary power from the EM at highway speeds (typically no more than 60 seconds). This will also decrease stress on the small ICE during extreme situations while allowing optimal fuel economy over the vast majority of U.S. Highways and driving situations.

Another advantage of the independent power mechanisms is that an all-wheel-drive (AWD) vehicle is possible at speeds above approximately 40 mph. There are two basic methods for achieving AWD: by using the ICE to power the rear wheels and the EM to power the front wheels, or by using the EM to power the rear wheels and the ICE to power the front wheels. AWD vehicles typically require far more complicated drivetrains which decrease drivetrain efficiency. However, there are many driving environments and circumstances where AWD is advantageous. Another advantage of this present invention is that AWD performance is achieved with superior efficiency.

BRIEF DESCRIPTION OF THE SEVERAL VIEWS OF THE DRAWING

FIG. 5 is a plan (top) view of an all-wheel-drive drivetrain configuration consisting of: a front-wheel-drive drivetrain using independent suspension with power input from the EMG and a rear-wheel-drive drivetrain using solid-axle suspension with power input from the ICE.

FIG. 6 is a plan (top) view of an all-wheel-drive drivetrain configuration consisting of: a front-wheel-drive drivetrain using independent suspension with power input from the ICE and a rear-wheel-drive drivetrain using solid-axle suspension with power input from the EMG.

DETAILED DESCRIPTION OF THE INVENTION

Figure 1:
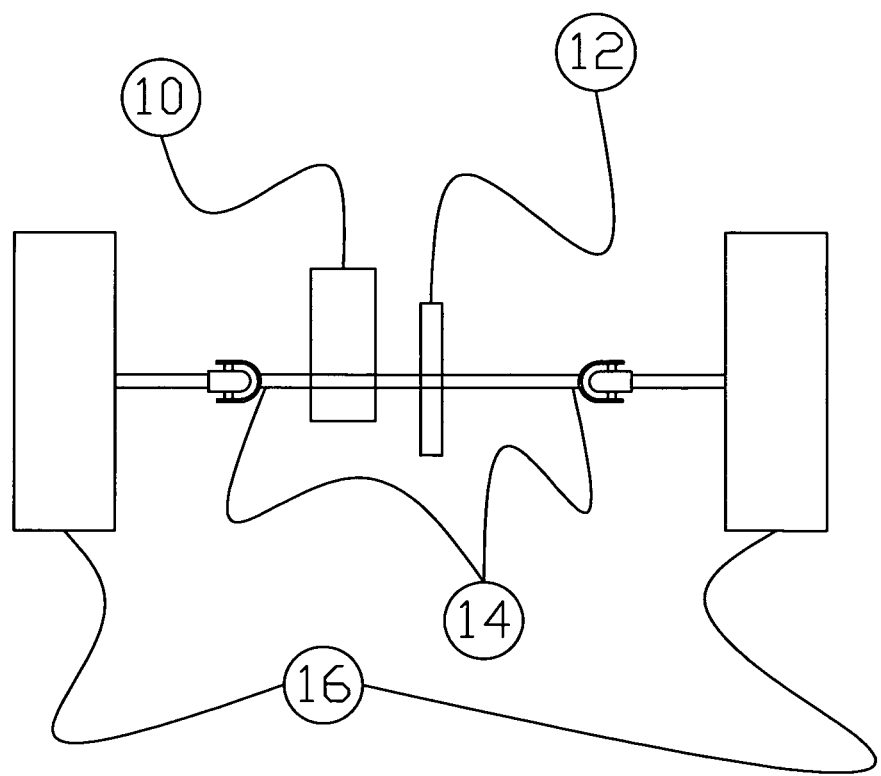
FIG. 1 is a plan (top) view of a front-wheel-drive or rear-wheel-drive drivetrain using independent suspension with power inputs from the EMG and ICE.
Figure 2:
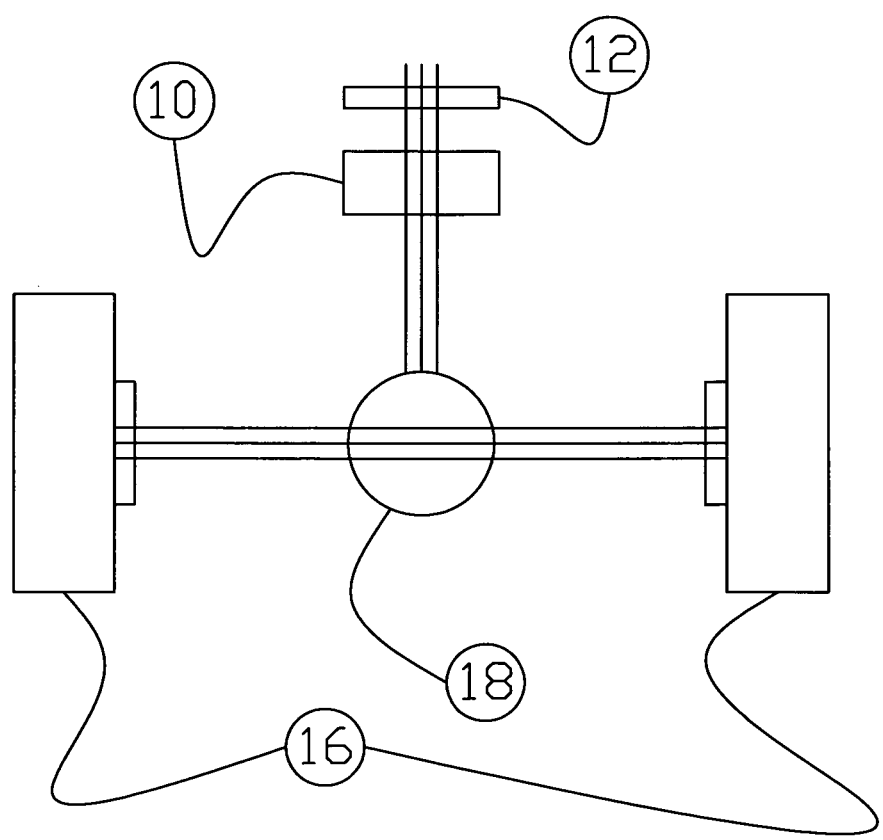
FIG. 2 is a plan (top) view of a rear-wheel-drive drivetrain using solid-axle suspension with power inputs from the EMG and ICE.
Figure 3:
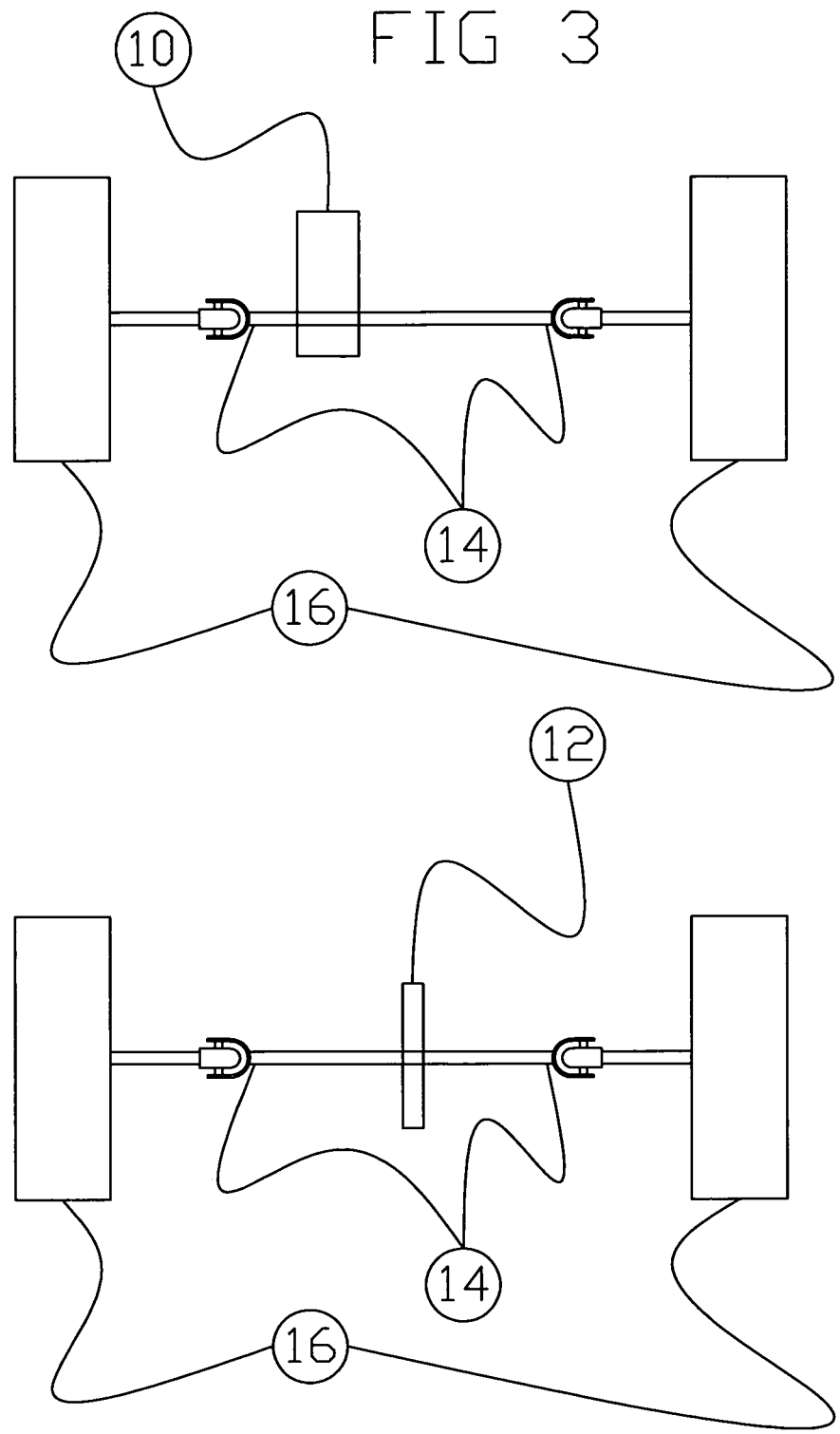
FIG. 3 is a plan (top) view of an all-wheel-drive drivetrain configuration consisting of: a front-wheel-drive drivetrain using independent suspension with power input from the EMG and a rear-wheel-drive drivetrain using independent suspension with power input from the ICE.
Figure 4:
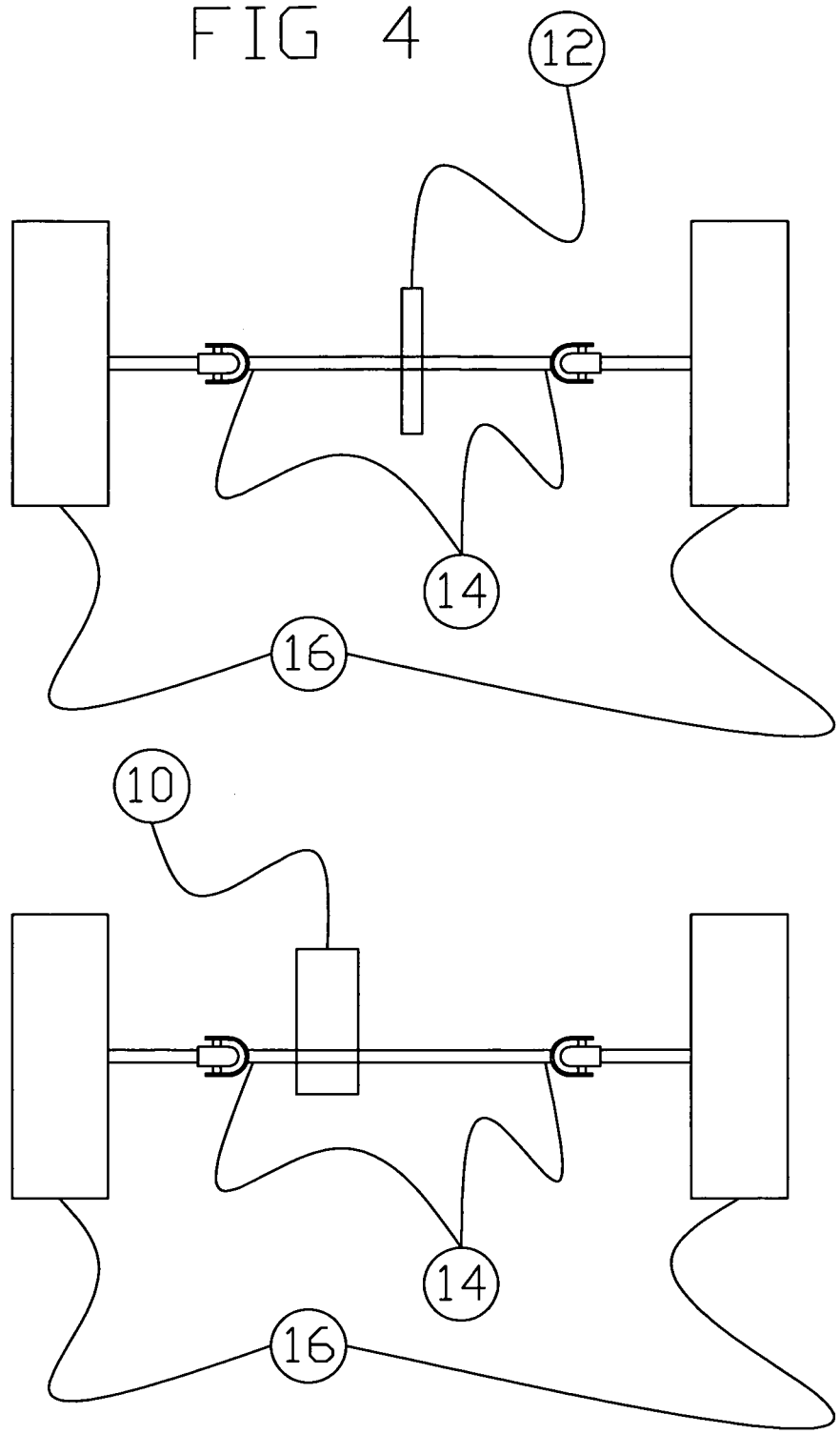
FIG. 4 is a plan (top) view of an all-wheel-drive drivetrain configuration consisting of: a front-wheel-drive drivetrain using independent suspension with power input from the ICE and a rear-wheel-drive drivetrain using independent suspension with power input from the EMG.

Referring now to the invention in more detail, in FIG. 1, FIG. 2, FIG. 3, FIG. 4, FIG. 5, and FIG. 6, there is shown a possible drivetrain configuration where the power is input from the gearbox of the EMG 10 at a constant gear ratio and the power is input from the belt drive or mechanical gears of the ICE 12 at a constant gear ratio. In FIG. 1, FIG. 3, FIG. 4, FIG. 5, and FIG. 6, there is shown an independent suspension where the power is transferred through the half-shafts 14 into the wheels 16. In FIG. 2, FIG. 5, and FIG. 6, there is shown a solid-axle suspension where the power is transferred through the differential 18 into the wheels 16.

In more detail, still referring to the invention of FIG. 1, FIG. 2, FIG. 3, FIG. 4, FIG. 5, and FIG. 6, the EMG 10 is a 3-phase alternating current (AC) electric motor with a digital motor controller/inverter (DMCI). The DMCI only requires a small amount of power to operate, but allows the EMG 10 to operate efficiently (80-95% efficiency) over a very wide RPM range. The DMCI also allows the electric motor to act as a generator, converting mechanical energy into electrical energy. For the purpose of this detailed description, the supporting components of the EMG 10 (the gearbox for the EMG 10, the DMCI, the switch between the EMG and the battery pack, and the battery pack) are collectively referred to as the EMG 10. The EMG 10 is always mechanically connected to the half-shafts 14 (FIG. 1, FIG. 3, FIG. 4, and FIG. 5) or the differential 18 (FIG. 2 and FIG. 6) via a constant-ratio gear mechanism, including, but not limited to, a 10:1 helical worm gear assembly. The EMG 10 uses no power while the vehicle is at rest, such as at stoplights or when the accelerator pedal is not pressed, such as coasting. The EMG 10 is geared such that highway speeds (approximately 85 mph) can be attained without any additional power input from the ICE 12. The EMG 10 can be electronically disengaged by utilizing a switch between the battery pack and the EMG 10. The EMG 10 is capable reversing the direction of power to the wheels, via a user-controlled toggle switch. The ICE 12 never powers the drivetrain in reverse. This allows for a variety of simple engagement methods of the ICE 12, including, but not limited to: threaded/splined mechanical actuators, friction or mechanical/spring clutch(es), or an optical logic-controlled engagement device. Further, the ICE 12 can be mechanically engaged to or disengaged from the half-shafts 14 (FIG. 1, FIG. 3, FIG. 4, and FIG. 6) or the differential 18 (FIG. 2 and FIG. 5) via a constant-ratio gear mechanism, including, but not limited to, a 2.5:1 belt drive system. The ICE 12 shall be geared such that: (a) moderate highway speeds (approximately 40 mph) may be accomplished without re-engaging the EMG 10 and (b) the desired top speed of the vehicle (varies greatly depending on vehicle aerodynamics, the ICE 12 power curve, and other factors) can be achieved using only the power from the ICE 12.

In further detail, still referring to the invention of FIG. 1, FIG. 2, FIG. 3, FIG. 4, FIG. 5, and FIG. 6, the invention operates in the following manner. At rest, no power is being used by the EMG 10 which is always mechanically connected to the half-shafts 14 or the differential 18. At rest, the ICE 12 is not running and mechanically disengaged from the half-shafts 14 and the differential 18. The EMG 10 is the only source of power to the half-shafts 14 and/or the differential 18 until highway speeds (at least 55 mph) are sustained for approximately 2 minutes with only moderate fluctuations in acceleration and deceleration. At that time, the driver is encouraged to engage the ICE 12 if the remaining journey will be in excess of 5 to 10 miles. For very short or low-speed journeys, the EMG 10 can operate efficiently and reliably. But for very long or high-speed journeys, the EMG 10 may not have enough stored energy to complete the journey and the reliability of the EMG 10 may be decreased by maintaining very high RPMs for a sustained period of time. For very long journeys at highway speeds, it makes sense to engage the ICE 12 in order to increase overall vehicle reliability, utilize existing fueling infrastructure to extend vehicle range, and maximize vehicle efficiency by removing wasteful multi-gear transmissions (including CVT, which has an infinite number of gears). The driver makes the decision to either maintain EMG 10 or to engage the ICE 12. If the EMG 10 is chosen, no change occurs and the ICE 12 remains mechanically disengaged from the half-shafts 14 and the differential 18. If the ICE 12 is selected, the ICE 12 is started by its own electrical starter. Then the rotational speed of the ICE 12 driveshaft is brought up to a rotational speed which is directly proportional (at its constant ratio, for example 2.5:1) to the rotational speed of the drivetrain half-shafts 14 and/or the differential 18. Then the ICE 12 is engaged/mechanically connected to the half-shafts 14 (FIG. 1, FIG. 3, FIG. 4, and FIG. 6) or the differential 18 (FIG. 2 and FIG. 5) through its constant-ratio gear mechanism (such as a 2.5:1 belt drive system) via an engagement device which may include (but is not limited to): threaded/splined mechanical actuators, friction or mechanical/spring clutch(es), or an optical logic-controlled engagement device. Then the EMG 10 is electronically disengaged via a switch.

When the ICE 12 is the only source of power at highway speeds, the driver may suddenly need a temporary increase in power. If the vehicle accelerator pedal is approximately 95% engaged (emergency acceleration), then the EMG 10 is electronically re-engaged via a switch. Under this scenario, the ICE 12 may remain mechanically engaged to the half-shafts 14 or the differential 18 in order to decrease the number of ICE 12 engagements and disengagements and increase the total power to the wheels 16. Once the vehicle accelerator pedal is relieved to only approximately 50% engaged, then the EMG 10 is electronically disengaged via a switch.

When the ICE 12 is the only source of power at highway speeds, the driver may slow down to a speed which is below highway speeds (less than 45 mph). Then the EMG 10 is electronically re-engaged via a switch. Under this scenario, the ICE 12 must be mechanically disengaged from the half-shafts 14 or the differential 18. One method of mechanically disengaging the ICE 12 from the half-shafts 14 or the differential 18 may be to simply turn off the ICE 12 because the power from the EMG 10 will automatically disengage threaded/splined connections or mechanical/spring clutch(es). In the event that the battery pack is discharged to approximately 30% of total capacity, the ICE 12 will automatically engage after 15 seconds of driving at highway speeds, and the driver will no longer have the option to utilize EMG 10 power except when the driver slows down to a speed which is below highway speeds (less than 45 mph) or when the vehicle accelerator pedal is pressed to approximately 95% of its maximum length (emergency acceleration).

When the ICE 12 is the only source of power at highway speeds, the driver may need a temporary increase in vehicle traction due to poor driving conditions. If the vehicle is using one of the drivetrains illustrated in FIGS. 3 through 6, the driver will have to option to engage the AWD mode. If the vehicle maintains a speed at which the EMG 10 and the ICE 12 may operate concurrently and the driver is more concerned about vehicle safety in poor driving conditions than energy efficiency, the driver may select the AWD mode which will electronically re-engage the EMG 10 via a switch. Under this mode, the ICE 12 may remain mechanically engaged to the half-shafts 14 or the differential 18 in order to increase the number of driven wheels and the total power to the wheels 16, thus resulting in improved vehicle responsiveness and traction. Once the AWD mode is unselected or the vehicle speed decreases below approximately 40 mph or the vehicle speed increases above approximately 85 mph, then the EMG 10 is electronically disengaged via a switch.

In further detail, still referring to the invention of FIG. 1, FIG. 2, FIG. 3, FIG. 4, FIG. 5, and FIG. 6, the advantages of the present invention include, without limitation: significant reduction in drivetrain losses, smooth and linear acceleration up to highway speeds (approximately 85 mph), high top speed while requiring significantly less power in order to maintain highway speeds, and increased maintenance intervals due to splitting mileage between EMG 10 and ICE 12. Further, this drivetrain takes advantage of the relative strengths of the EMG 10 and ICE 12. The EMG 10 is geared for acceleration, but it is highly efficient, requires very little maintenance, has a large RPM range (including zero), and revs faster than traditional internal combustion engines because of its lower rotational mass at the shaft (no flywheel). The ICE 12 is geared for maintaining a constant speed, but it is simple, inexpensive, and makes use of existing infrastructure for long-distance travel.

What is claimed is:

1. A plug-in hybrid drivetrain for a vehicle comprising:
a) a reversible electric motor operable as a generator;
b) at least two driven wheels;
c) a gearbox with a constant (non-variable) gear ratio for the electric motor which is always mechanically connected to both the electric motor and the driven wheels and which contains a constant-ratio gear mechanism;
d) an internal combustion engine with its own electrical starter;
e) an actuator which engages the internal combustion engine to the driven wheels;
f) a belt drive or mechanical gears with a constant (non-variable) gear ratio for the internal combustion engine selectively mechanically connecting the internal combustion engine to the driven wheels via the actuator;
g) a battery pack chargeable from an AC electrical outlet or photovoltaic solar panels;
h) a digital motor controller/inverter which controls the electric motor efficiency, power, torque, rotational speed, and direction; and
i) a switch between the battery pack and the electric motor.

2. The drivetrain of claim 1, wherein said electric motor and its gearbox are continuously mechanically connected to the rear wheels of a vehicle and the internal combustion engine and its belt drive or mechanical gears are mechanically connectable to and disconnectable from the rear wheels of a vehicle.

3. The drivetrain of claim 1, wherein said electric motor and its gearbox are continuously mechanically connected to the front wheels of a vehicle and the internal combustion engine and its belt drive or mechanical gears are mechanically connectable to and disconnectable from the front wheels of a vehicle.

4. The drivetrain of claim 1, wherein said electric motor and its gearbox are continuously mechanically connected to the front wheels of a vehicle and the internal combustion engine and its belt drive or mechanical gears are mechanically connectable to and disconnectable from the rear wheels of a vehicle.

5. The drivetrain of claim 1, wherein said electric motor and its gearbox are continuously mechanically connected to the rear wheels of a vehicle and the internal combustion engine and its belt drive or mechanical gears are mechanically connectable to and disconnectable from the front wheels of a vehicle.

6. A drivetrain for a hybrid electric vehicle comprising:
a) a plurality of wheels;
b) a gearbox with a constant (non-variable) gear ratio which contains a first constant ratio gear mechanism;
c) an electric motor continuously mechanically connected to at least one of said wheels through said gearbox;
d) a second constant ratio gear mechanism or a constant ratio belt drive;
e) an engagement device; and
f) an internal combustion engine selectively mechanically connected to at least one of said wheels through said second constant ratio gear mechanism or belt drive and said engagement device, wherein
g) said electric motor and said internal combustion engine are independently operable to drive a hybrid electric vehicle through the respective at least one connected wheel.

7. The drivetrain as in claim 6 and further including a battery pack electrically connected to said electric motor.

8. The drivetrain as in claim 7 wherein said electric motor is an alternating current electric motor electrically connected to said battery pack through a digital motor controller/inverter.

9. The drivetrain as in claim 8 wherein said electric motor is selectively operable as a generator to charge said battery pack when the hybrid vehicle is in motion and said electric motor is not driving the hybrid electric vehicle.

10. The drivetrain as in claim 6 wherein said electric motor is reversible.

11. The drivetrain as in claim 6 wherein said battery pack is chargeable from an AC electrical outlet or photovoltaic solar panels.

12. The drivetrain as in claim 6 wherein said engagement device is selected from the group consisting of a threaded mechanical actuator, a splined mechanical actuator, a friction clutch, a mechanical clutch, a spring clutch and an optical logic-controlled engagement device.

13. The drivetrain as in claim 6 wherein said plurality of wheels includes at least one front wheel and at least one rear wheel.

14. The drivetrain as in claim 13 wherein said electric motor is continuously connected to said at least one front wheel and said internal combustion engine is selectively connected to said at least one front wheel.

15. The drivetrain as in claim 13 wherein said electric motor is continuously connected to said at least one rear wheel and said internal combustion engine is selectively connected to said at least one rear wheel.

16. The drivetrain as in claim 13 wherein said electric motor is continuously connected to said at least one rear wheel and said internal combustion engine is selectively connected to said at least one front wheel.

17. The drivetrain as in claim 13 wherein said electric motor is continuously connected to said at least one front wheel and said internal combustion engine is selectively connected to said at least one rear wheel.

18. A drivetrain for a hybrid electric vehicle comprising:
a) a plurality of wheels;
b) a first constant ratio gear mechanism;
c) an alternating current electric motor continuously mechanically connected to at least one of said wheels through said first constant ratio gear mechanism;
d) a battery pack;
e) a digital motor controller/inverter interfacing said electric motor with said battery pack, said digital motor controller/inverter converting direct current from said battery pack to alternating current usable by said electric motor and controlling operation of said electric motor through a range of operating speeds;
e) a second constant ratio gear mechanism or a constant ratio belt drive;
f) a clutch; and
g) an internal combustion engine selectively mechanically connected to at least one of said wheels through said second constant ratio gear mechanism or belt drive and said clutch, said internal combustion engine having a power curve, wherein
h) said electric motor and said internal combustion engine are independently operable to drive a hybrid electric vehicle through the respective at least one connected wheel.

19. The drivetrain as in claim 18 wherein said first constant ratio gear mechanism has a ratio selected to convert said range of operating speeds of said electric motor to a ground speed of the hybrid electric vehicle ranging from rest to a highway speed of approximately 85 miles per hour with only said electric motor operating to drive the respective at least one wheel.

20. The drivetrain as in claim 18 wherein said second constant ratio gear mechanism or belt drive has a ratio selected to convert a range of operating speeds of said internal combustion engine within said power curve to a ground speed of the hybrid electric vehicle ranging from approximately 40 miles per hour to a designed top speed of the hybrid electric vehicle with only said internal combustion engine operating to drive the respective at least one wheel.

* * * * *